United States Patent Office 3,050,367
Patented Aug. 21, 1962

3,050,367
SEPARATION OF BORON ISOTOPES
Karl Erik O. Holmberg, Stockholm, Sweden, assignor to Quartz & Silice S.A., Paris, France, a corporation of France
No Drawing. Filed Oct. 2, 1957, Ser. No. 687,602
Claims priority, application Sweden July 9, 1952
3 Claims. (Cl. 23—205)

For the concentration of isotopes of certain light elements chemical exchange processes have often been used. In chemical reactions isotopes usually react with slightly different velocities and consequently in an equilibrium reaction the equilibrium constant differs a little from 1 and thus the isotope percentage can be a little different in the two chemical species. A well known example is the equilibrium between ammonia and ammonium ion:

$$N^{15}H_3 + N^{14}H_4^+ = N^{14}H_3 + N^{15}H_4^+$$
(gas)  (sol.)  (gas)  (sol.)

with the equilibrium constant 1.031, i.e.

$$\frac{(N^{14}H_3)(N^{15}H_4^+)}{(N^{15}H_3)(N^{14}H_4^+)} = 1.031$$

The simple process separation factor, $\alpha$, is given by the ratio between the isotope ratios in the two compounds, in this case

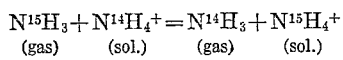

$$\alpha = \frac{(N^{15}/N^{14})\,NH_4^+\text{ solution}}{(N^{15}/N^{14})\,NH_3\text{ gas}} = 1.031$$

The $NH_4^+$ ion phase, thus, is a little enriched in the heavy nitrogen isotope.

To have a useful enrichment it is necessary to multiply the simple process separation factor, which has hitherto usually been done by means of a column process. An ammonium salt solution is flowed down a packed column is mixed with NaOH solution, then $NH_3$ is driven out completely by boiling and caused to flow up the column in countercurrent to the ammoinium salt solution whereby an exchange occurs so that $N^{15}$ goes to the solution and is concentrated at the bottom of the column. The $NH_3$ gas passing from the top of the column may be discarded or it may, by addition of acid, be converted to ammonium salt solution, which is again passed down the column, and the supply of fresh ammonium salt solution may be reduced correspondingly. After some time the column attains equilibrium, when the percentage of $N^{15}$ at the bottom of the column no longer increases, and then or a little earlier material enriched in $N^{15}$ may be withdrawn. The percentage of $N^{15}$ depends on the number of theoretical plates ($n$) of the column under the prevailing conditions. It is possible to define a total separation factor R as follows:

$$R = \frac{(N^{15}/N^{14})\text{ bottom}}{(N^{15}/N^{14})\text{ top}} = \alpha^n$$

The transport of $N^{15}$ through the column is determined by the difference in $N^{15}$ concentration of the ammonium salt solution and of the ammonia gas at the top. For an isotope with a low concentration, N, where N is the mole fraction of the said isotope in the element, the net transport, T, of that isotope through the column is given by the formula:

$$T = L(\alpha - 1)N$$

where L is the total flow of the element through the column. L and T may both be expressed in moles per unit time. The total flow, L, is many times the transport, since $\alpha$ is always near one, and consequently large amounts of chemicals are consumed.

Other well known exchange reactions are:

Between HCN and $CN^-$ for concentration of $C^{13}$
$\alpha = 1.012$
Between $CO_2$ and $HCO_3^-$ for concentration of $C^{13}$
$\alpha = 1.012$
Between $SO_2$ and $HSO_3^-$ for concentration of $S^{34}$
$\alpha = 1.019$
Between $H_2O$ and $CO_2$ for concentration of $O^{18}$
$\alpha = 1.039$ A more detailed description of exchange reactions is given in "Preparation and Measurements of Isotopic Tracers," by D. Wright Wilson, A. O. C. Nier and Stanley P. Reimann, J. W. Edwards, Ann Arbor, Michigan, 1946, pp. 1–10, and the references given there, p. 10.

Another isotope separation method is the fractional distillation, which can be used in favourable cases. It is simple to perform and does not consume large amounts of chemicals but chiefly heat energy. A drawback is that the simple process equilibrium factors are small, seldom more than 1.005, and thus very large columns are needed to bring about a more considerable enrichment and transport. Known examples are distillation of water for concentration of $O^{18}$ ($\alpha = 1.004$ at 100° C. and $\alpha = 1.007$ at 50° C.) and distillation of carbon monoxide for concentration of $C^{13}$ ($\alpha = 1.011$ at −202° C.).

The present invention relates to a new method of isotope separation which can suitably be named "exchange distillation" since it can be regarded as a combination of the exchange process and fractional distillation giving the advantage of good separation factors like the exchange process without the high consumption of chemicals characteristic of this process in combination with the simple apparatus and handling of the distillation process.

In order to obtain these results the invention consists in performing a countercurrent exchange reaction between a compound A containing the element the isotopes of which are to be separated and a compound AB which on heating to a suitable temperature dissociates reversibly giving gaseous A and a compound B which is essentially liquid. The process is performed in the following way. A liquid phase containing AB is flowed in one direction along a cascade (e.g. a distillation column). If AB is solid it may be obtained in liquid phase by addition of a solvent C. At one end of the cascade AB is dissociated by heating giving gaseous A which is flowed in the opposite direction along the cascade countercurrently to the liquid. B is delivered separately to the opposite end of the cascade in which end A and B are recombined to AB by cooling. If a solvent has been added it may be so volatile as to follow A and B in the gas phase or else after stripping it may be recirculated to the other end of the cascade. It is thus possible to perform a chemical exchange process in a way similar to a distillation. Isotopically enriched fractions are obtained from the ends of the cascade, and the process may be performed discontinuously like a batch distillation or continuously like a continuous distillation.

On account of the reversible equilibrium $AB = A + B$ the liquid phase will contain at least small amounts of A and B in a free form, in the same way the gas phase may contain undissociated AB. The only essential condition is that the relative amounts of A and AB are amply different in gas and liquid phase.

The separation factors of exchange reactions are generally more favourable at low temperatures. It is thus often preferable to perform the exchange distillation at a low temperature, that is under a moderate vacuum. If the compound AB at its melting point has a vapor pressure over atmospheric pressure it is often preferable to perform the exchange distillation at atmospheric pressure or lower and to use a solvent to obtain AB in liquid phase.

Below there are given some examples of exchange distillations according to the invention, in which AB is decomposed by heating and the more volatile compound A leaves the less volatile B as a gas. From the bottom of the column the component B may be recirculated to the top and flowed down the column in countercurrent to the gas or vapour A. In this invention A=$BF_3$, B=anisole.

*Example 1*

$C_6H_5OCH_3 \cdot BF_3$ in liquid form is flowed down a column, at about atmospheric pressure. At the lower end of the column the liquid is heated to give a gas phase consisting chiefly of $BF_3$, which goes up the column in countercurrent to the liquid ($C_6H_5OCH_3 \cdot BF_3$), and a liquid phase consisting of $C_6H_5OCH_3$, practically free from $BF_3$, which is cooled and recirculated to the top of the column, where it recombines with $BF_3$ to form $C_6H_5OCH_3 \cdot BF_3$. In a column having 30 theoretical plates there will be an equilibrium enrichment with a total separation factor $R \sim 2.3$, $B^{10}$ concentrating at the bottom of the column.

This application is a continuation-in-part of applicant co-pending application Serial No. 361,858, filed June 15, 1953, now abandoned.

I claim:

1. The method of separating the boron isotope of mass 10 from the boron isotope of mass 11 which comprises forming a liquid complex of boron trifluoride and anisole, heating said complex to cause dissociation thereof into liquid anisole and gaseous boron trifluoride, establishing a countercurrent flow of said liquid complex and said gaseous boron trifluoride in a countercurrent system while maintaining said liquid complex and said gaseous boron trifluoride in intimate contact with one another, whereby the isotopic species of boron trifluoride containing boron of mass 10 concentrates in the liquid complex and the isotopic species of boron trifluoride containing boron of mass 11 concentrates in the gaseous boron trifluoride, and withdrawing said two isotopic species from the systems near the points at which they concentrate.

2. The method of separating the boron isotope of mass 10 from the boron isotope of mass 11 which comprises forming a liquid complex of boron trifluoride and anisole, heating said liquid complex to cause dissociation thereof into gaseous boron trifluoride and liquid anisole containing substantially no boron trifluoride, establishing a countercurrent flow of said liquid complex and said gaseous boron trifluoride while maintaining said liquid complex and said gaseous boron trifluoride in intimate contact with one another, further recycling the liquid anisole to the top of the column, there recombining it with said gaseous boron trifluoride to reform the complex, whereby the isotopic species of boron trifluoride containing boron of mass 10 concentrates in the liquid complex and the isotopic species of boron trifluoride containing boron of mass 11 concentrates in the gaseous boron trifluoride, and withdrawing said two isotopic species from the system near the points at which they concentrate.

3. The method of separating boron isotopes comprising forming a liquid complex of boron trifluoride containing the isotopes to be separated and anisole, flowing said complex downwardly through a column, heating the complex at the bottom of the column to cause dissociation thereof into gaseous boron trifluoride and passing the gaseous boron trifluoride upwardly through the column in countercurrent contact with the complex, circulating said liquid phase depleted of gaseous boron trifluoride from the bottom to the top of the column and recombining it with boron trifluoride to form additional complex, thereby causing boron trifluoride containing $B^{10}$ to concentrate at the bottom of the column and boron trifluoride containing $B^{11}$ to concentrate at the top of the column, and withdrawing product enriched in one of said isotopes from the column.

References Cited in the file of this patent
UNITED STATES PATENTS 2,377,396     Axe _____ June 5, 1945
2,796,330     Crist et al. _____ June 18, 1957